United States Patent [19]

Magone et al.

[11] 4,017,572
[45] Apr. 12, 1977

[54] METHOD OF MOLDING ARTICLES OF POLYMERIC FOAM SUBSTANTIALLY FREE FROM FLASHING

[75] Inventors: Raymond L. Magone, Redondo Beach, Calif.; Samir N. Saaty, Orange, Conn.

[73] Assignee: The Upjohn Company, Kalamazoo, Mich.

[22] Filed: Apr. 15, 1975

[21] Appl. No.: 568,256

Related U.S. Application Data

[62] Division of Ser. No. 439,573, Feb. 4, 1974, abandoned.

[52] U.S. Cl. .................................. 264/51; 264/313; 264/314; 264/338; 425/817 R; 425/DIG. 19
[51] Int. Cl.² .......................................... B29D 27/04
[58] Field of Search .......... 264/45.2, 54, 313, 314, 264/315, 51, 338; 425/DIG. 19, DIG. 29, 817 R

[56] References Cited

UNITED STATES PATENTS

| | | | |
|---|---|---|---|
| 858,192 | 6/1907 | Lucas | 264/314 |
| 1,146,413 | 7/1915 | Edison | 264/314 X |
| 2,148,704 | 2/1939 | Merritt | 425/DIG. 19 |
| 2,411,043 | 11/1946 | Klassen | 425/DIG. 19 |
| 2,907,074 | 10/1959 | Rhodes | 264/314 X |
| 2,979,775 | 4/1961 | White | 264/54 |
| 3,006,306 | 10/1961 | Pfeiffer et al. | 425/DIG. 19 |
| 3,056,183 | 10/1962 | Pigeot | 264/314 X |
| 3,158,089 | 11/1964 | Fillol | 425/DIG. 19 |
| 3,185,432 | 5/1965 | Hager | 264/54 X |
| 3,240,846 | 3/1966 | Voelker | 264/46.2 |
| 3,265,783 | 8/1966 | Jacobs | 264/46.5 |
| 3,535,418 | 10/1970 | Daum et al. | 264/314 X |
| 3,576,930 | 4/1971 | Watters et al. | 264/314 X |
| 3,803,277 | 4/1974 | Bassett | 264/54 X |
| 3,809,739 | 5/1974 | Gelin | 264/314 X |
| 3,856,902 | 12/1974 | Kirkpatrick | 264/45.2 |

FOREIGN PATENTS OR APPLICATIONS

| | | | |
|---|---|---|---|
| 966,966 | 10/1950 | France | 264/54 |
| 2,027,934 | 12/1971 | Germany | 264/45.2 |
| 144,840 | 6/1920 | United Kingdom | 264/313 |

*Primary Examiner*—Philip Anderson
*Attorney, Agent, or Firm*—Denis A. Firth; John Kekich

[57] ABSTRACT

An improved molding apparatus is described for use with relatively light weight molds, particularly molds for articles having a plurality of voids therein. A light weight two-piece mold, one-half being substantially rigid and the other relatively flexible, is disposed in a jig. The two halves of the mold are held in sealing relationship by inserting a hollow inflatable bag between the exterior of the relatively flexible mold piece and the interior wall of the adjacent jig member and inflating said bag to a pressure superior to that exerted by the expanding foam mix in the mold.

The use of the improved apparatus obviates the need for molds of high structural strength (and hence excessive weight) and gives molded articles, particularly those of complex configuration, which are free from flashing.

6 Claims, 4 Drawing Figures

METHOD OF MOLDING ARTICLES OF POLYMERIC FOAM SUBSTANTIALLY FREE FROM FLASHING

This is a division of application Ser. No. 439,573, filed Feb. 4, 1974 now abandoned.

BACKGROUND OF THE INVENTION

1. Field of the Invention

This invention relates to molding processes and is more particularly concerned with foam articles and with processes for molding polymer foam articles.

2. Description of the Prior Art

It is well-recognized in the art of molding polymer foams, such as polyurethane, polyisocyanurate and the like foams, that relatively high pressures are generated by the expanding foam when the molding is carried out under "packing" conditions. The latter comprise charging to the mold an amount of polymer foam forming mixture in excess of that necessary to just fill the mold under free rise conditions.

Such packing conditions are employed particularly in the molding of parts of relatively high density i.e. of the order of 5 to 45 pcf or higher, for example, furniture parts and the like which are intended as substitutes for corresponding parts fabricated from wood, picture frames, decorative relief sculptures, grids for fluorescent lighting and the like.

In order to withstand the pressure developed in the mold and maintain the latter closed during the molding operation, it has become necessary to utilize molds constructed from material of high structural strength together with complex clamping mechanisms as well as auxiliary strengthening components such as jigs surrounding the mold. This has become particularly necessary in the case of the molding of articles of intricate design in which any distortion of the mold, by pressures created during the molding process, can result in bowing or distortion of the part. This is critical also in the case where it is necessary, as in the case of molding of a part containing a number of voids, that the two halves of the mold remain in sealing engagement not only at the outer edges but at a plurality of points in the interior of the closed mold.

For these reasons it has hitherto been common in the art to construct molds having a high degree of structural strength and this inevitably means that such molds are excessively heavy, particularly when fitted with necessary clamping devices and auxiliary strengthening devices. This in turn leads to complex equipment required to open and close the molds as well as to increased labor costs in running such operations on a commercial basis.

German Offenlegungsschrift No. 2,027,934, published Dec. 16, 1971, describes an attempt to reduce the complexity of equipment required to hold a mold closed during foaming by employing an inflatable bag as a part of the clamping mechanism. The arrangement shown in this reference does not, however, obviate the requirement to use mold parts having sufficient structural strength to resist deformation under pressure.

We have now found that the drawbacks inherent in the art processes described above can be overcome in a simple but elegant manner which will now be described.

SUMMARY OF THE INVENTION

This invention comprises the utilization of an apparatus for molding an article of polymer foam which apparatus comprises in combination:

a two piece mold one of said mold pieces being substantially rigid and the other of said mold pieces being relatively flexible;

a cavity enclosed by said mold pieces for receiving polymer foam forming reactants;

jig members adapted to be disposed in spaced apart relationship on either side of said mold;

an inflatable hollow flexible member disposed between said relatively flexible mold piece and the jig member adjacent to the latter; and means for inflating said hollow flexible member whereby the two mold pieces are held together in sealing relationship one with the other.

The invention also comprises a process for molding an article of polymer foam which comprises the steps of:

charging polymer foam forming mix to the cavity of a two piece mold, one of said mold pieces being substantially rigid and the other of said mold pieces being relatively flexible;

closing said mold;

disposing jig members in spaced apart relationship on either side of said closed mold;

interposing an inflatable hollow flexible member between the exterior of the said relatively flexible mold piece and the interior wall of the jig member adjacent said relatively flexible mold piece; and inflating said hollow flexible member to a pressure such that the two pieces of said mold are held in sealing relationship throughout the expansion and solidification of said polymer foam.

DETAILED DESCRIPTION OF THE INVENTION

Figure 1:
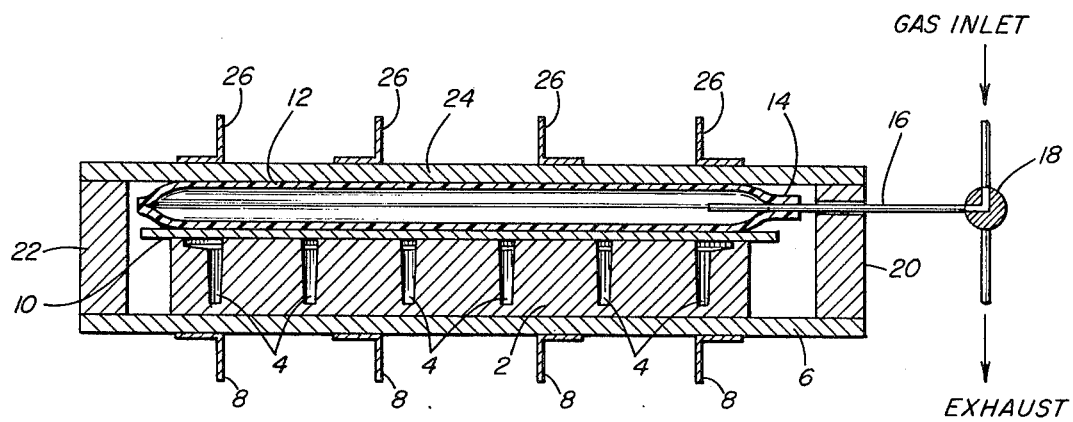
FIG. 1 shows a cross-sectional view of a particular embodiment of a molding apparatus of the invention.

The apparatus of the invention can be employed in the molding of articles from any polymer foam which is derived by polymer formation produced by chemical interaction of two or more polymer-forming ingredients, with simultaneous blowing caused by gas generated in the chemical reaction and/or by volatilization of a blowing agent specifically added to the reaction mixture. Typical examples of such polymer foams are polyurethane and polyisocyanurate foams both of which are derived from polyisocyanates. Polyurethane foams are derived by interaction of polyisocyanates with a substantially stoichiometric proportion of an active-hydrogen containing material, usually a polyol, in the presence of a catalyst for the reaction between isocyanato groups and active hydrogen containing groups, and of a blowing agent. The methods of preparing polyurethane foams are well-known in the art and do not require detailed description herein: see, for example, U.S. Pat. Nos. 3,336,243; 3,331,790; 3,324,053; 3,318,824;

3,311,573; 3,310,506; 3,087,901; 3,085,983; 3,080,329; 3,075,928; 3,075,926; 3,073,788; 3,072,582; 3,061,556; 3,060,137; 3,053,778; 3,050,477; 3,039,976; 3,037,946; 3,036,022; Saunders et al, Polyurethanes, Chemistry and Technology, Part II, Interscience Publishers, New York (1964).

Similarly the methods for preparation of polyisocyanurate foams, which involve trimerizing a polyisocyanate under foam producing conditions, are also well-known in the art: see, for example, U.S. Pat. Nos. 3,763,057; 3,725,319; 3,723,364; 3,723,363; 3,715,337; 3,676,380; 3,657,161; 3,644,168; 3,625,872; 3,620,986; and 3,516,950.

When molding the above foams and like foams in closed molds under "packing" conditions, i.e. conditions in which more polymer foam mix is charged to the mold than is sufficient to just fill the mold after expansion, substantial pressures are generated. In order to withstand such pressures without deformation or opening of the mold it has been customary hitherto to employ molds of sufficient strength, to provide heavy duty closing mechanism, and even to apply additional strengthening means surrounding the molds. Where the articles to be molded are of significant sizes it becomes necessary to fabricate molds of such weight that they can no longer be handled manually but require mechanical means to accomplish opening and closing as well as transportation.

The present invention provides means for substantially reducing the overall weight and size of molds and accessory clamping and strengthening means, and, hence, for reducing the need for auxiliary mechanical equipment for handling the molds. The use of the molds of the invention also reduces the amount of labor and time required for the molding operation and thereby reduces the overall cost of the molding operation as well as the cost of the molds themselves.

The apparatus of the invention employs a two-piece mold one piece of which is constructed of relatively flexible material. Generally, but not necessarily, one of said pieces is a sheet-like member which closes the mold, the other member having the appropriate mold cavity formed therein. For example, the mold cavity can be present in the substantially rigid mold piece which latter can be fabricated from aluminum, steel, and like metals conventionally employed in the art of polymer foam mold making. In this case the second mold piece takes the form of a relatively flexible sheet. By relatively flexible is meant a material which is ordinarily rigid but which is capable of being flexed to a partial extent by application of force to the face thereof. Examples of such materials are plywood, metal sheets of thickness up to about 0.25 inches, masonite, reinforced resin sheets, high density rigid foam, noncellular polyurethane hard plastics, and the like.

Alternatively, the mold cavity can be present in the relatively flexible mold piece in which case the latter can be fabricated or molded from elastomeric material such as polyurethane elastomers, silicone elastomers, rubber and the like. In this event the second mold piece takes the form of a substantially rigid material such as heavy gauge sheet aluminum, steel, reinforced resins, heavy gauge plywood, and the like.

Generally speaking the two mold pieces are not attached to one another by hinge means, clamp means or any other form of attachment. They are of such relative size and shape that they can be brought together, when desired, to form a completely closed mold cavity.

In conjunction with the two piece mold there are provided jig members which can be assembled on either side of the mold in spaced apart relationship. These jig members can take a variety of forms conventional in the molding art. In a typical embodiment said members comprise sheets of relatively rigid material such as ¾ inch plywood which are braced by means of one, or a plurality, of angle iron members traversing one face thereof and anchored thereto. Two such sheets are disposed, one on each side, of the enclosed mold and are maintained in substantially parallel relationship, at a distance from each other slightly in excess of the depth of the mold, by spacer members disposed at suitable locations on the perimeters of the jig members. The jig members are secured in place by bolts, quick release clamps, or other suitable fastening means.

Finally, there is disposed between the outer surface of whichever of the mold pieces is relatively flexible and the inner surface of the jig member adjacent to said mold piece, an inflatable, hollow flexible bag member. Advantageously, the latter takes the form of a substantially flat bag having a surface area which is co-extensive with the outer surface of the mold piece with which it is in contact. The bag is provided with valve means whereby it can be inflated, by compressed gas such as air, nitrogen, or the like, to any desired pressure within the working limits of the bag. Said valve means also serves to deflate the bag after the molding operation is complete and the mold is to be disassembled.

Said flexible bag member is advantageously constructed of elastomeric material which is of sufficient strength to withstand the pressures to be exerted upon it and will also withstand abrasion, exposure to polymer foam chemicals and the like. A particularly useful material for fabrication of said bag is elastomeric polyurethane from which the bag can be constructed by blow molding techniques or by casting progressively as will be described in more detail hereafter.

The pressure to which the flexible bag member is inflated in any particular instance depends on the pressure to be developed in the mold by the particular foam being molded. Advantageously the pressure to which the bag is inflated is slightly in excess of, e.g. from about 1 pcf to about 10 pcf higher than, the maximum pressure developed in the mold.

The bag member, when inflated and in operation in the apparatus of the invention, serves to maintain the relatively flexible mold piece in sealing contact with the substantially rigid mold piece. It further acts to counterbalance any localized buildup in pressure at particular sites in the mold. In particular, where there are voids in the part to be molded, and, as consequence thereof, it is necessary for the two mold pieces to maintain contact not only at the perimeter of the mold cavity but at a plurality of points other than the perimeter, the flexible member serves to maintain such contact. If such contact is not maintained "flashing" of the part will occur. This means that the molded part will show webs or trails of foam attached to what would otherwise be sharp corners of the mold piece. Such flashing is caused by failure of the seal between the mold pieces at the sites in question with consequent leakage of foam forming material between the faces of the mold pieces at these sites.

The use of the inflatable bag member in the apparatus of the invention serves to eliminate substantially all such flashing thereby eliminating, or substantially reducing, the amount of trimming of the mold part after its removal from the mold. Prior to the development of the apparatus herein described it was only possible to avoid such flashing by use of high strength rigid molds with heavy duty clamping means.

The use of the flexible bag in combination with appropriate mold release paper also greatly facilitates venting of the mold i.e. to permit removal of air in the mold displaced by the expanding foam without permitting leakage of foam mix.

Further, as set forth above, the use of the bag member eliminates the need for clamping the mold pieces together and not only permits substantial reduction in weight and structural strength of the mold pieces but also permits the mold to be fabricated from relatively inexpensive and readily available materials. The use of the apparatus of the invention also assures simplicity and ease of operation.

In carrying out a molding operation using the apparatus of the invention when the mold piece containing the mold cavity is of substantially rigid material, said mold piece with cavity is positioned on the inner side of one jig member, the required amount of polymer foam mix is charged to said cavity in the mold, the second mold piece is placed in position so as to close the mold, the flexible bag member is positioned upon the said second mold piece, the second jig member is secured in place, and the bag is inflated to the desired pressure and maintained thereat during the molding process. To demold the finished article the inflatable bag is deflated and the above procedure is reversed thereby disassembling the mold structure.

In a preferred method of carrying out the above operation, the second (upper) jig member is hingably attached to one of spacer the spacer members which separate the first and second jig members, so that the complete jig can be maintained in assembled form. Access to the interior of the jig can be achieved by lifting the appropriate edge of the hingably attached second (upper) jig member. Further, the flexible bag member can be attached, by appropriate clips or like fastening means, to the underside of the second (upper) jig member. Using this arrangement, the molding operation is greatly simplified. Thus, in a very short space of time, the required amount of polymer foam mix can be charged to the cavity in the mold, the second mold piece placed in position so as to close the mold, and the second (upper) jig member lowered into place. The bag is thereafter inflated to the desired pressure as before.

In carrying out a molding operation using the apparatus of the invention when the mold piece containing the mold cavity is of relatively flexible material the sequence of steps is modified appropriately. Thus, in one embodiment of such an operation, the mold piece containing the mold cavity is positioned on top of the flexible bag member supported on the first (lower) jig member. Foam mix is charged to the cavity, the second mold piece is placed in position, followed by the second (upper) jig member. In a particular embodiment, the second (upper) jig member also serves as the second (substantially rigid) mold piece. The bag is finally inflated to the desired pressure as in the previous embodiment.

In a preferred embodiment of the latter molding operation, the first and second jig members, with appropriate spacing members, are assembled to form a completed jig. One edge of the jig is left open, without a spacer member, so that access to the interior of the jig can be achieved readily. The flexible bag member is installed on the floor of the jig. The mold piece with cavity is charged with foam mix at a station outside the jig, the second mold piece is installed on the first piece to close the mold, and the closed mold is then inserted through the open side of the preassembled jig and placed on top of the deflated flexible bag member. In the final step of the operation, the bag is inflated to the desired pressure as in previous embodiments.

The molding apparatus of the invention will now be illustrated further by reference to the accompanying Figures.

Figure 2:
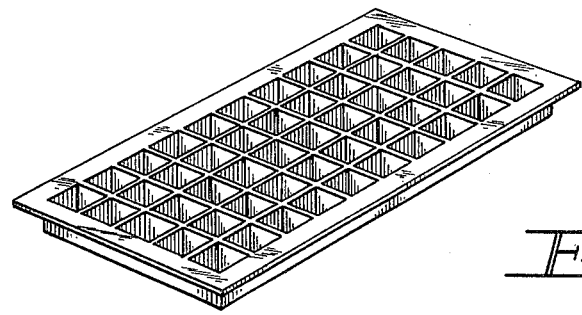
FIG. 2 shows a perspective view of the article which is molded using the molding apparatus of FIG. 1.

In FIG. 1 there is shown a particular embodiment of molding apparatus of the invention. In this embodiment the mold piece (2), having the mold cavity (4) therein, is fabricated of substantially rigid material such as aluminum. The mold cavity (4) corresponds to the article, a grid for covering a fluorescent light fixture, shown in perspective view in FIG. 2. The underside of the mold piece (2) is positioned on jig member (6) which comprises a relatively rigid sheet, for example ¾ inch plywood, which is braced on its underside by a plurality of angle irons (8) or like reinforcing elements. The number and dimensions of the angle irons (8) can be varied as desired in accordance with the extent of reinforcement which is necessary for any particular application.

The second mold piece (10) is a relatively flexible sheet member, fabricated from light gauge aluminum, copper or the like or masonite, ¼ inch plywood and the like, which serves to close the mold when positioned in sealing engagement on top of the first mold piece (2). Prior to actual use the underside of mold piece (10), which is to make contact with the foam rising in the mold cavity (4), is coated with a conventional mold release agent, such as a silicone oil, micro crystalline waxes, and the like, prior to being positioned in place. Alternatively, a sheet (not shown) of mold release material such as polyethylene, silicone coated paper, breathable release papers, polyvoid flatboard, and the like, is interposed between the underside of second mold piece (10) and the open cavity of the first mold piece (2).

An inflatable flexible bag member (12), in the form of a flat, substantially rectangular bag having sides of substantially the same configuration as the surface of the second mold piece (10), is positioned on top of the latter. The flexible bag member (12) is provided with a nipple (14) which is connected via tube (16) to a three-way valve (18), located on the exterior of the mold apparatus, and thence to a source of compressed gas for inflation of the bag (12), or to exhaust means. The tube (16), in connecting the nipple (14) to the valve (18), passes through a slot (not shown) in side spacer member (20). The latter and corresponding side spacer member (22) serve to support the upper jig member (24) in spaced, parallel relationship to the first jig member (6). The jig member (24) is provided with a plurality of angle irons (26), or like reinforcing elements, the number and dimensions of which can be varied as desired in accordance with the extent of reinforcement necessary for any particular application.

The jig members (6) and (24) are held in the desired spaced apart relationship by appropriate clamping means (not shown) which can take the form of quick release clamps, bolts, and the like.

In preparing a molded article using the apparatus shown in FIG. 1, the bottom half (2) of the mold is positioned on the jig member (6) with the side spacer members (20) and (22) already in place thereon. The requisite amount of polymer foam forming mix is charged to the mold cavity (4) and, immediately thereafter, the second mold piece (10), precoated with release agent or lined with appropriate release paper, is positioned on top of the first mold piece (2). The flexible bag member (12) is positioned on top of the second mold piece (10) and finally the second jig member (24) is secured in place by clamps or like means. If desired for ease of operation the flexible bag member (12) is pre-attached to the jig member (24) so that the two can be positioned in place in one operation in the assembly of the mold apparatus.

In a particularly preferred embodiment the jig member (24), with flexible bag member (12) attached thereto, is hingably attached to spacer member (22) so that said jig member can be readily moved from a position in which the jig is open for removal or insertion of the mold to the closed, operative position for molding.

After the various elements have been assembled, the flexible bag member (12) is inflated by use of compressed gas, such as compressed air, nitrogen, carbon dioxide and the like, to a pressure in excess of that which will be generated by the rising foam in the mold. Generally speaking the pressure to which it is necessary to inflate the bag (12) is within the range of about 5 psi to about 20 psi. In any given case the pressure in the bag (12) is at least about 5 psi in excess of the pressure which will be generated by the foam mix in the mold. If desired the valve (18) can be disconnected from the compressed gas supply after the inflation of bag member (12) is complete.

After the molding is completed, the bag member (12) is allowed to deflate by opening valve (18) to the exhaust side.

Figure 3:
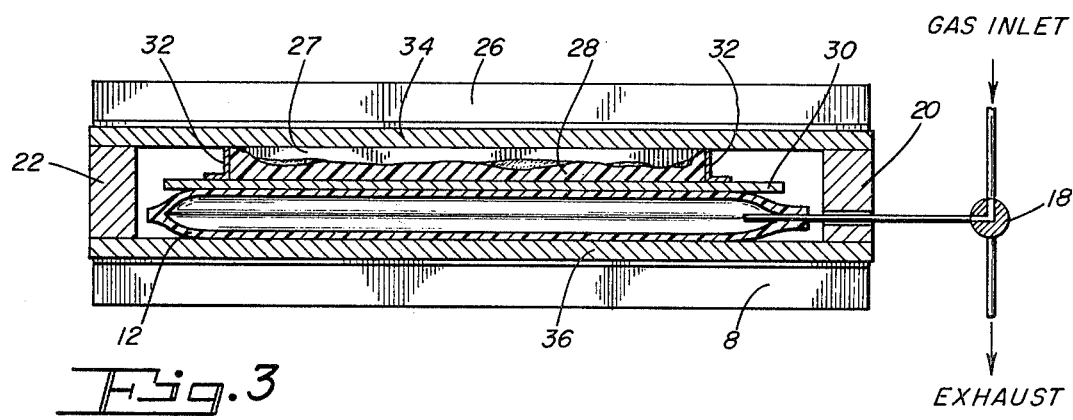
FIG. 3 shows a cross-sectional view of a second embodiment of a molding apparatus of the invention.

In FIG. 3 there is shown a further embodiment of a mold apparatus in accordance with the invention. The embodiment of FIG. 3 illustrates the assembly of the mold when the mold cavity (27) is located in the relatively flexible mold piece (28). The latter is prepared from material such as elastomeric polyurethane, silicone rubber and the like and, in the particular embodiment shown in FIG. 3, takes the form of a mold for a simulated basrelief wood carved panel. The relatively flexible mold piece (28) is provided with a backing sheet member (30) which can be fabricated from metal, plywood, composite material such as masonite, and the like. Rigid side supports (32) are provided to prevent distortion of the sides of the relatively flexible mold piece (28). These side supports (32) also act as spacer means to maintain the desired distance between the upper jig member (34) and the backing sheet member (30).

The relatively flexible mold piece (28) and backing sheet member (39) are positioned on the flexible bag member (12) which in turn is supported on the lower jig member (36). The lower and upper jig members (34) and (36) are held in spaced apart relationship by means of side spacer members (20) and (22) as in the previous embodiment, and by suitable clamping means (not shown) as in the previous embodiment.

In the embodiment of FIG. 3 the jig member (34) also serves as the substantially rigid mold piece which, together with the relatively flexible mold piece (28), forms the mold cavity (27). The inner surface of the jig member (34), which comes into contact with the rising foam, is coated with a mold release agent as previously described or is provided with a mold release sheet liner as previously described.

In molding a foam article using the apparatus of FIG. 3, the relatively flexible mold piece (28) with side supports (32) and support sheet (30) are positioned on the flexible bag member (12) which has previously been positioned on the jig member (36) with side spacer members (20) and (22) previously assembled. The desired amount of polymer foam mix is charged to the mold cavity (26) and the upper jig member (34) is thereafter immediately positioned and secured in place. In the final step the inflatable bag member (12) is inflated to the desired pressure, as discussed above, using compressed gas via the valve (18).

In a particularly preferred method of molding a foam article using the apparatus of FIG. 3, the jig is completely assembled by securing jig members (34) and (36) in place in combination with side spacer members (20) and (22). One vertical side of the assembled jig is left open. The flexible bag member (12) is mounted in the assembled jig in deflated form. In carrying out a molding operation in accordance with this embodiment of the invention, the mold piece (28), with supporting sheet (30) and side braces (32) is assembled outside the jig and is charged with foam mix, covered with a release paper sheet, inserted into the jig, through the open vertical side, and positioned on the deflated flexible bag member (12). The latter is then inflated to the desired pressure as in previous embodiments. In demolding the articles from the apparatus the bag member (12) is deflated and the mold is removed from the jig without any need to disassemble the latter.

Figure 4:
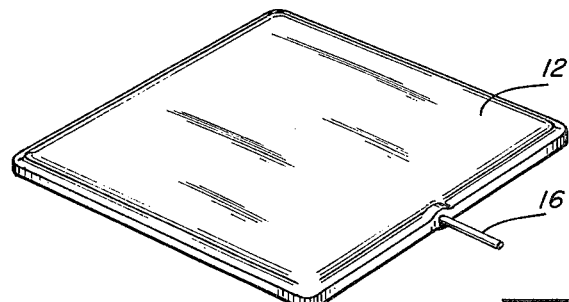
FIG. 4 shows a perspective view of a particular embodiment of an inflatable hollow flexible bag member used in the molding apparatus of the invention.

A perspective view of a bag member (12), shown in cross-section in FIGS. 1 and 3, is shown in FIG. 4. A particularly useful method of making such a bag member, from cast elastomeric material in a continuous molding operation, is shown and described in detail in our copending application Ser. No. 439,572, filed Feb. 4, 1974 and now abandoned. The disclosure of this copending application is hereby incorporated in the present application by reference. Alternatively the bag member can be fabricated by preparing two mirror image sheets of elastomeric material, by cutting or molding, and securing said sheets together by appropriate adhesive means at the perimeters thereof. The nipple (14) and tube (16) can be incorporated by placing the nipple (14) between the upper and lower sheets at a suitable point in the perimeter of said sheets prior to applying adhesive and sealing the two sheets together. Alternatively, the nipple (14) can be sealingly inserted into the perimeter of the bag member (12) after the latter has been fabricated as a complete bag.

The above embodiments have been given for purposes of illustration only and are not intended to be limiting. It will be appreciated by one skilled in the art that various modifications of the apparatus and process of the invention can be made without departing from the scope of the invention. Illustratively, while the embodiments described above have dealt with rectangular molds and correspondingly shaped flexible bag members it will be readily apparent that said molds can have circular or irregular peripheral configurations and that the flexible bag members can have corresponding configurations.

We claim:
1. A process for molding an article of polymer foam substantially free from flashing using a polymer foam forming mix comprising ingredients which undergo chemical interaction with simultaneous blowing in situ, said process being characterized by the steps of:

provide a two piece mold, one of said mold pieces being substantially rigid and the other of said mold pieces being relatively flexible;

providing a jig comprising two facing jig members held in permanent, spaced apart, relationship one of said jig members having disposed thereon an inflatable hollow flexible bag;

providing an opening in said jig to permit insertion of said assembled two piece mold between said facing jig members without disassembly, in whole or in part, of said jig;

charging polymer foam forming mix to the cavity of said two piece mold;

inserting said charged mold, after assembly thereof, between the said two facing jig members via said opening in said jig;

inflating said hollow flexible bag to a pressure such that the two mold pieces are held in sealing engagement one with the other and said mold is held in clamped engagement with said jig solely by means of said inflated bag;

permitting said foam mix to expand and set in said mold so disposed in said jig;

thereafter deflating said flexible bag and removing said mold and contents from said jig via said opening without disassembly of said jig in whole or in part, and demolding said article of polymer foam.

2. A process according to claim 1 wherein said pre-assembled jig takes the form of a box of rectangular cross-section having an opening in a side panel thereof to permit insertion of said mold into the interior of said box.

3. A process according to claim 1 wherein said inflatable hollow flexible member extends over substantially the whole of the outer surface of said relatively flexible mold piece.

4. A process according to claim 1 wherein the outer surfaces of said mold pieces and the inner surfaces of said jig members are substantially planar.

5. A process according to claim 1 wherein the relatively flexible mold piece is in the form of a sheet forming a cover for a mold cavity disposed in said substantially rigid mold piece.

6. A process according to claim 1 wherein the substantially rigid mold piece is in the form of a sheet which forms a cover for a mold cavity disposed in said relatively flexible mold piece.

* * * * *

UNITED STATES PATENT OFFICE
CERTIFICATE OF CORRECTION

Patent No. 4,017,572         Dated April 12, 1977

Inventor(s) Raymond L. Magone and Samir N. Saaty

It is certified that error appears in the above-identified patent and that said Letters Patent are hereby corrected as shown below:

Column 7, line 56:                    Should read:

sheet member (39)                    sheet member (30)

Signed and Sealed this

Twenty-eighth Day of June 1977

[SEAL]

Attest:

RUTH C. MASON
*Attesting Officer*

C. MARSHALL DANN
*Commissioner of Patents and Trademarks*